United States Patent [19]
Andrews

[11] Patent Number: 5,363,128
[45] Date of Patent: Nov. 8, 1994

[54] DEVICE AND APPARATUS FOR SCAN LINE PROCESS DIRECTION CONTROL IN A MULTICOLOR ELECTROSTATOGRAPHIC MACHINE

[75] Inventor: John R. Andrews, Fairport, N.Y.
[73] Assignee: Xerox Corporation, Stamford, Conn.
[21] Appl. No.: 951,744
[22] Filed: Sep. 25, 1992
[51] Int. Cl.[5] .............................................. G01D 9/42
[52] U.S. Cl. ..................................... 346/108; 359/40; 359/41
[58] Field of Search .................... 359/40, 41; 346/108, 346/160; 358/481, 493; 250/236

[56] References Cited

U.S. PATENT DOCUMENTS

| | | | |
|---|---|---|---|
| 3,654,624 | 4/1972 | Becker et al. | 346/108 |
| 3,657,707 | 4/1972 | McFarland et al. | 346/108 |
| 3,843,231 | 10/1974 | Borel et al. | 359/40 |
| 4,213,158 | 7/1980 | DeBenedictis | 358/296 |
| 4,441,126 | 4/1984 | Greenig et al. | 358/293 |
| 4,559,562 | 12/1985 | Kramer | 358/208 |
| 4,600,837 | 7/1986 | DiStefano et al. | 250/235 |
| 4,613,877 | 9/1986 | Spencer et al. | 346/160 |
| 4,660,094 | 4/1987 | Yoshimoto et al. | 358/285 |
| 4,767,190 | 8/1988 | Dir et al. | 346/40 |
| 4,877,310 | 10/1989 | Seachman et al. | 359/41 |
| 4,903,067 | 2/1990 | Murayama et al. | 346/160 |
| 4,958,914 | 9/1990 | Owechko et al. | 350/342 |
| 5,018,835 | 5/1991 | Dorschner | 359/40 |
| 5,093,674 | 3/1992 | Storlie | 346/108 |
| 5,159,351 | 10/1992 | Hotomi et al. | 346/108 |

Primary Examiner—Benjamin R. Fuller
Assistant Examiner—Randy W. Gibson
Attorney, Agent, or Firm—Denis A. Robitaille

[57] ABSTRACT

An optical element for the selective deflection of a scan line in a process direction in a raster output scanner (ROS) electrophotographic printer. The optical element includes a chamber containing a nematic liquid crystal material having a variable index of refraction as a function of voltage applied thereacross. The ROS includes a control and feedback system coupled to a variable voltage source for applying a biasing voltage across the optical element to control the variable index of refraction of the optical element for selectively deflecting the scan line in the process direction.

22 Claims, 4 Drawing Sheets

DEVICE AND APPARATUS FOR SCAN LINE PROCESS DIRECTION CONTROL IN A MULTICOLOR ELECTROSTATOGRAPHIC MACHINE

This invention relates generally to a raster output scanning system for producing electrostatic latent images from electronically stored data in, for example, an electrostatographic printing machine and, more particularly, concerns a device and apparatus for providing controlled alignment of a scan line in the process direction of movement of a photoconductive member in a multi-color electrostatographic printing machine.

The basic reprographic process used in an electrostatographic printing machine generally involves an initial step of charging a photoconductive member to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer material including toner particles adhering triboelectrically to carrier granules into contact with the latent image. The toner particles are attracted away from the carrier granules to the latent image, forming a toner image on the photoconductive member which is subsequently transferred to a copy sheet. The copy sheet having the toner image thereon is then advanced to a fusing station for permanently affixing the toner Image to the copy sheet in image configuration.

The approach utilized for multicolor electrostatographic printing is substantially identical to the process described above. However, rather than forming a single latent image on the photoconductive surface in order to reproduce an original document, as in the case of single color printing, multiple latent images corresponding to different color separations are sequentially recorded on the photoconductive surface. Each single color electrostatic latent image is developed with toner of a color complimentary thereto and the reprographic process described above is repeated for each of the differently colored images with a respective toner of complimentary color. Thereafter, each single color toner image is transferred to the copy sheet in superimposed registration with the prior toner image, creating a multi-layered toner image on the copy sheet. Finally, this multi-layered toner image is permanently affixed to the copy sheet in substantially conventional manner to form a finished color copy.

Electrostatographic printing machines have increasingly utilized digital electronics technology to produce output copies from input video data representing original image information. In this case, it is known to use a raster output scanner (ROS) for exposing the charged portions of the photoconductive member to record the electrostatic latent image thereon. Generally, the ROS has a laser for generating a collimated beam of monochromatic radiation. The laser beam is modulated in conformance with the image information and is directed toward the surface of the photoconductive member through an optics system to form the desired image on the photoconductive member. In the optics system, the modulated laser beam is reflected through a lens onto a scanning element, typically a rotating polygon having mirrored facets such that the light beam is reflected from a facet and thereafter focused to a "spot" on the photoconductive member. The rotation of the polygon causes the spot to scan linearly across the photoconductive member in a fast scan (i.e., scan line) direction. Meanwhile, the photoconductive member is advanced in a process direction orthogonal to the scan line direction and relatively more slowly than the rate of the fast scan, the so-called slow scan direction in this manner, the modulated laser beam is scanned across the recording medium in a raster scanning pattern. The light beam is intensity-modulated in accordance with an input image serial data stream at a rate such that individual picture elements ("pixels") of the image represented by the data stream are exposed on the photosensitive medium to form the latent image.

In a single pass color xerographic system, a plurality of ROS stations are selectively energized to create successive image exposures, each corresponding to the three primary colors. A fourth ROS station may also be added if black images are to be created as well. Thus, each image area on the photoconductive member makes at least three passes relative to an image scan line formed by the modulated laser beam of the ROS system to produce a multi-color image. Alternatively, highlight color applications might use black plus one or two colors. Each image pass is eventually superimposed on one another such that each image must be measured to within a 0.1 mm circle or within a tolerance of ±0.05 mm, and each color image must be registered in both the photoreceptor process direction (slow scan direction) and in the direction transverse to the process direction (fast scan direction).

In many printing machines, the sampling rate of the slow scan direction data equates to 300 lines per inch or more. Furthermore, it has been shown that errors in the slow scan direction of as small as 1% of the nominal line spacing may be perceived in a half tone or continuous tone image. This implies a need for a high degree of control in positioning the scan line in the slow scan direction on the image plane, especially in such applications as multiple beam and multiple ROS color printers where a plurality of scan lines are written onto a single photoreceptor. Errors of the scan line position in the slow scan direction arise from many sources, including polygon and/or photosensitive member motion flaws, facet and/or image plane (e.g., photoconductive member) surface defects, etc. These errors are most commonly addressed in the prior art by passive or active in-line optics. The following disclosures appear to be relevant:

U.S. patent application No. 4,213,158 Patentee: DeBenedictis Issued: Jul. 15, 1980

U.S. patent application No. 4,600,837 Patentee: DiStefano et al. Issued: Jul. 15, 1986 U.S. patent application No. 4,660,094 Patentee: Yoshimoto et al. Issued: Apr. 21, 1987 U.S. patent application No. 4,903,067 Patentee: Murayama et al. Issued: Feb. 20, 1990 U.S. patent application No. 4,958,914 Patentee: Owechko et al. Issued Sep. 25, 1990

The relevant portions of the aforementioned disclosures are summarized as follows:

U.S. Pat. No. 4,213,158 discloses an optical data recording system utilizing acoustic pulse imaging to minimize image blur. That patent discloses a technique for utilization of an acousto-optic modulator in a laser scanning system wherein the laser beam incident on the acousto-optic modular interacts with the acoustic pulse, the writing beam is scanned across the surface of the recording medium and the system magnification is selected to be substantially equal to the ratio of the velocity of the writing beam to the velocity of the sound wave in the acousto-optic modulator to minimize image blurring on the surface of the recording medium.

U.S. Pat. No. 4,600,837 to DiStefano et al. discloses an optical scanning apparatus with dynamic scan path control wherein a scan path is altered by two different prisms which are positioned before a polygon in the scan path. The two prisms are controlled by error signals generated by a grating to alter the scan path in both a horizontal and a vertical direction.

U.S. Pat. No. 4,660,094 to Yoshimoto et al. discloses a method of focus adjustment of a picture scanning and recording system wherein a projection lens is moved automatically in a direction normal to a recording drum to correct for drum variations caused by machining or environmental conditions, such as temperature. A rotary encoder generates pulses which are representative of the recording drum's rotation. The pulses are used by a motor to move a mirror assembly closer to, or farther away from, the drum. An image sensor, within the light path, detects when the beam is out of focus and adjusts it.

U.S. Pat. No. 4,903,067 provides a multi-image forming apparatus for forming image data onto photosensitive drums by an electrophotographic system. The multi-image forming apparatus includes a control circuit for controlling the image forming circuit so as to form registration marks to match the positions of the images on the drums and detectors for detecting the recording positions of the registration marks. The apparatus further includes a correcting circuit so that the images formed on the photosensitive drums can be accurately formed on the transfer paper by reading and matching the position of the registration marks.

U.S. Pat. No. 4,958,914 discloses an optical intensity-to-position mapping and light deflector apparatus and method wherein a liquid crystal prism is used to deflect a light beam. Voltage gradients are varied in accordance with optical intensity at corresponding locations in the received light to correct any optical variations at that particular location. The prism of that patent deflects higher intensity light more than lower intensity light.

Each of these various prior art schemes has disadvantages and/or shortcomings. For example, the use of precision optics requires not only high quality optical elements, but also tight control in the positioning of those optics in order to obtain the requisite very precise mechanical control sufficient to adjust spot position as required in many cases. In order to achieve this level of spot position control with the acousto-optic modulators, an acoustic wave must be established and maintained with great precision. These acousto-optic modulators are relatively expensive and require a correspondingly accurate high frequency signal generator and related electronics to produce and maintain the acoustic waves. Further, such systems which incorporate feedback circuits to move rotating or translating mirrors generally operate too slowly to correct for motion quality errors because mirror components are relatively bulky and are difficult to move precisely and quickly.

According to the present invention, an optical element for selective deflection of a light beam is provided including a member having a pair of generally planar external surfaces, the member defining a chamber having a progressively decreasing volume from one marginal region to another marginal region opposed therefrom with the chamber being interposed between the planar surfaces. The member also includes a volume of nematic material having a variable index of refraction substantially filling the chamber.

According to another aspect of the present invention, a raster output scanning (ROS) system is provided, comprising a system for generating a light beam modulated in accordance with a video input data signal and for scanning the light beam onto a movable imaging surface being transported in a process direction to provide successive scan lines on the movable imaging surface. The ROS system further includes an optical element for selectively deflecting the light beam in a direction parallel to the process direction including a member having a variable index of refraction as a function of a voltage applied thereto and a voltage source for applying a biasing voltage to the optical element. A control and feedback system is also provided for measuring registration errors and applying appropriate biasing voltages to the optical element to deflect the light beam and create a properly registered image.

According to yet another aspect of the present invention, an electrostatographic printing machine of the type in which a raster output scanner produces a modulated light beam is provided, wherein the modulated light beam is scanned across a movable photoconductive imaging surface being transported in a process direction for recording latent images thereon. The electrostatographic printing machine further includes an optical element for selectively deflecting the modulated light beam in a direction parallel to the process direction including a member defining a chamber having a variable index of refraction as a function of voltage applied thereto and a voltage source for applying a biasing voltage to the optical element. A control and feedback system is also provided for measuring registration errors and applying appropriate biasing voltages to the optical element to deflect the light beam and create a properly registered image.

Other features of the present invention will become apparent as the following description proceeds and upon reference to the drawings in which.

While the present invention will hereinafter be described in connection with a preferred embodiment thereof, it will be understood that this description is not intended to limit the invention to that embodiment. On the contrary, it is intended that the present description of the invention covers all alternatives, modifications, and equivalents as may be included within the spirit and scope of the invention as defined by the appended claims.

Figure 6:
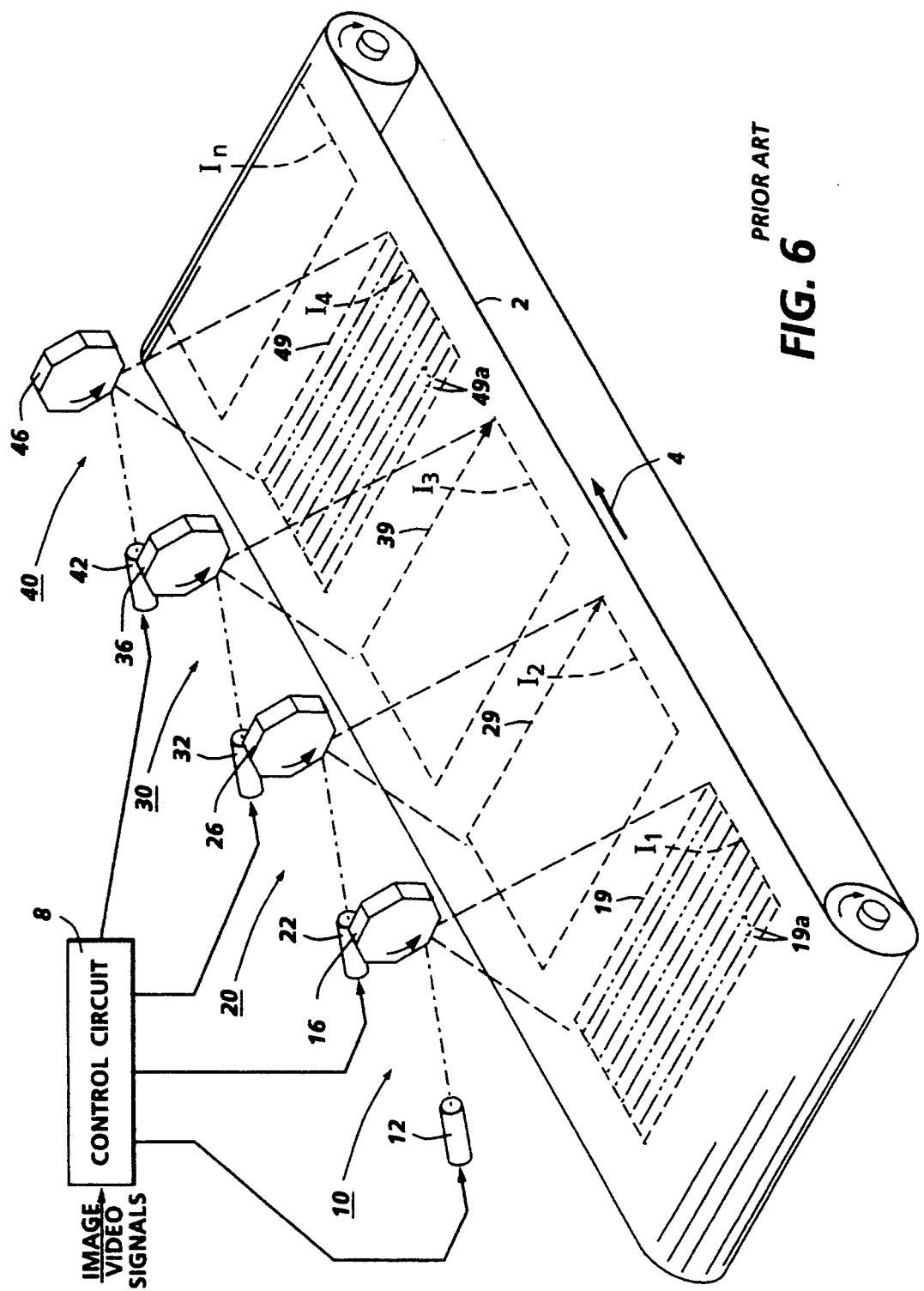
FIG. 6 shows a schematic perspective view of a prior art, single pass, multiple ROS system for forming a multicolor image on a xerographic machine.

Referring initially to FIG. 6, before describing the invention in detail, there is shown a prior art, single pass, ROS multicolor printing system having four ROS systems, 10, 20, 30, and 40. The multicolor printing system includes a photoreceptor belt 2, driven in a process direction, indicated by the arrow 4. The length of the belt 2 is designed to accept an integral number of spaced image areas, $l_1$-$l_n$, represented by dashed line rectangles. Each image area has an associated charging station (not shown) which places a predetermined electrical charge on the surface of belt 2. Each image area $l_1$-$l_n$ is exposed successively by ROS systems 10, 20, 30, 40, respectively. As each of the image areas $l_1$-$l_n$ reaches a transverse line of scan, represented by lines 19, 29, 39, 49, the image area is progressively exposed on closely spaced transverse raster lines, shown generally with exaggerated longitudinal spacing as reference numerals 19a and 49a on the image areas $l_1$ and $l_4$, respectively.

Downstream from each exposure station, a development station (not shown) develops the latent image formed in the associated image area. A fully developed color image is then transferred to an output sheet. The charge, development, and transfer stations are conventional in the art. Details of charge and development xerographic stations n a multiple exposure single pass system are disclosed, for example, in U.S. Pat. No. 4,660,059, the contents of which are hereby incorporated by reference.

Each ROS system 10, 20, 30, and 40 contains its own conventional scanning components, as variously described in the art. For purposes of simplicity, each ROS system 10, 20, 30, 40 is shown as having two components, namely, a laser light source 12, 22, 32, 42 and a rotating polygon 16, 26, 36, 46, respectively. It will be appreciated by those of skill in the art that multiple scan lines may also be generated with a single ROS.

An exemplary ROS system 10, includes a gas, or preferably, diode laser light source 12, having an output which is modulated by signals from control circuit 8, which output is optically processed to impinge on the facets of rotating polygon 16. Each facet reflects the modulated incident laser beam as it is rotated to produce a scan line which is focused at the photoreceptor surface 2. Control circuit 8 contains the circuit and logic modules which respond to input video data signals and other control and timing signals to operate the photoreceptor drive in synchronism with the image exposure and to control the rotation of the polygon 8 by a motor (not shown). The other ROS systems 20, 30, 40, have their own associated laser diodes 22, 32, 42, and polygons 26, 36, 46, respectively.

Figure 1:
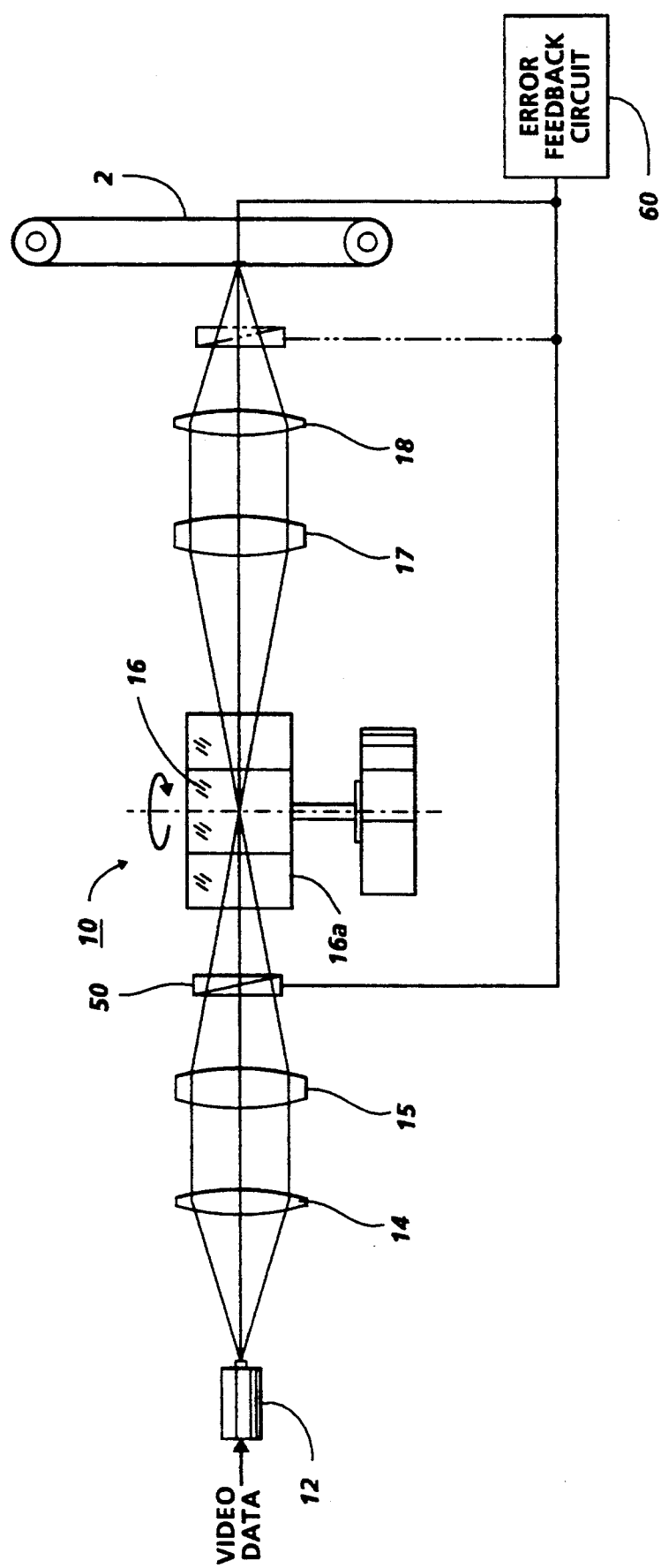
FIG. 1 shows a plan view of the general optical configuration of a Raster Output Scanner (ROS) system, showing an optical element according to the present invention disposed at various locations along the scan path of the ROS.

Moving now to a more detailed description of a ROS system used, for example, in an electrostatographic printing machine, FIG. 1 shows a general configuration of the optical system and the optical path of a ROS. For purposes of the present discussion, a single ROS system will be described in detail with reference to ROS system 10. It will be understood that each ROS system 20, 30, 40 may comprise similar components or may include other components, as the case may be. Initially, input video data is transmitted to the laser source 12 which embodies a self-modulating light source for producing a modulated diverging beam of coherent light. The beam may be collimated by a spherical collimating lens 14 and then refocused by an imaging lens 15. The beam is next incident upon a rotating polygon 16 having at least one mirrored facet 16a for reflecting the beam through a post scan optics system. Other suitable devices for scanning are known in the art, including rotating holograms, rotating diffraction gratings, etc. The post scan optics system reconfigures the beam reflected by facet 16a to a circular or elliptical cross-section, refocuses the beam to the proper point on the surface of photoreceptor/drum 2, and corrects for scan nonlinearity (f-theta correction). A recollimating lens and a 1× (or other working magnification)toroidal lens 18 can be disposed between the scanning device 16 and the photoreceptor 2 to correct for wobble (scanner motion or facet errors) and other defects where appropriate.

In the exemplary embodiment of FIG. 1, the rotation of the mirrored facets 16a causes the reflected beam to be deflected and thereby scanned across a photosensitive image member or the photoreceptor belt 2. Thus, if polygon 16 is rotated in a clockwise fashion, a beam reflected from one of its moving facets 16a will be caused to scan from left to right on the photoreceptor belt 2. Polygon 16 is preferably driven by a motor (not shown) through a shaft, with the angular velocity of the polygon 16 synchronized with the angular velocity of belt 2. The combination of the rotation of polygon 16 with rotation of the photoreceptor belt 2 in the direction as shown by arrow 4, causes scanning to proceed, raster manner formed by an array of scan lines. A typical ROS can illuminate the charged portion of drum 2 at a rate of about 600 pixels per inch; e.g. at 600 spi resolution.

The optic system described hereinabove discloses the basic elements of a raster output scanning system as is well known in the art. In accordance with the present invention, an additional optical element 50 is provided and disposed along the scan path of the optical system for deflecting the scan line in the process direction such that the entire scan line will be repositioned on the imaging member. In FIG. 1, optical element 50 is shown located between the laser diode 12 and the collimating lens 14, but the optical element 50 of the present invention may alternatively be disposed between the f-theta correction lens 17 and the magnification lens 18 or between the magnification lens 18 and the imaging member 2, as shown in phantom in FIG. 1. Placement of the optical element 50 in the prescan optics permits control of the entire scan line by manipulation of the beam emitted from laser diode 12. Conversely, positioning of the optical element 50 in the post-scan optic system requires manipulation of the entire scan line through the scan path such that a larger optical element is required for manipulating the entire scan line through the optical element 50 before being transmitted to the image receiver 2.

Optical element 50 is preferably a parallel aligned nematic liquid crystal cell as is generally known in the art. In utilizing such a cell, light polarization is parallel to the alignment of the liquid crystal material. It will be understood that other liquid crystal materials may be utilized, such as smectic phase crystal material. In accordance with the present invention, the optical element 50 placed in the scan path of a ROS includes a cell or chamber having a linearly varying thickness containing a volume of nematic liquid crystal material. When a biasing voltage is applied to the optical element 50, a combination of bias fields are formed across the cell or chamber to produce a condition in which the molecules of the liquid crystal material in the cell are aligned by the bias fields in a generally uniform direction with respect to the magnitude of the voltage applied to the optical element 50.

Figure 2:
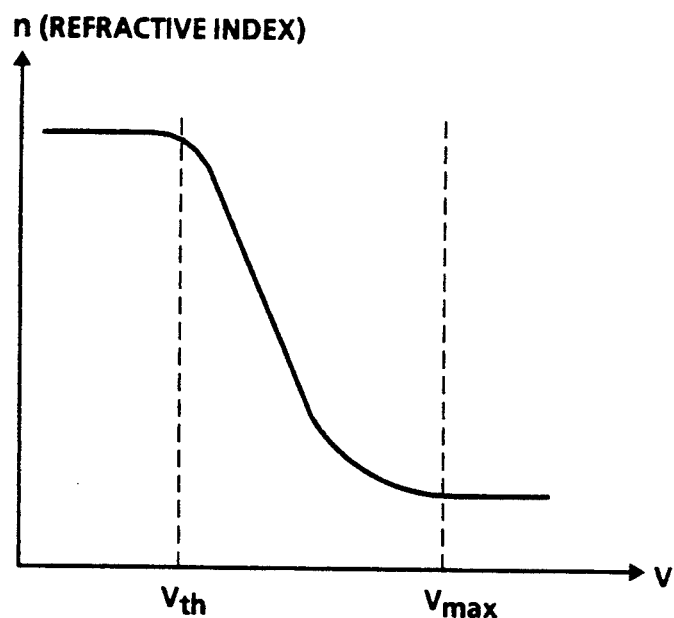
FIG. 2 shows a graphic representation of the relationship between the index of refraction and the voltage applied to a nematic material.

The manner in which the refractive index of the liquid crystal material varies in response to the biasing voltage is shown in FIG. 2. As shown in FIG. 2, by varying the magnitude of the biasing voltage, the refractive index $n_e$ of the liquid crystal material can be freely controlled for light polarized parallel to the alignment direction of the nematic crystal material. That is, when the level of the biasing voltage exceeds the threshold value $V_{th}$, the arrangement of the liquid crystal molecules will change from homogeneous toward homeotropic and the refractive index $n_e$ will also change with respect to the voltage. Thus, as the biasing voltage applied to the optical element 50 is varied, the refractive index of the liquid crystal material changes, thereby changing the angle at which the laser beam exits the optical element 50. This angle is continuously variable within the limits set by the available change in the refractive index.

Typically, a liquid crystal cell is made up of parallel plates which form a liquid crystal layer of uniform thickness. Such liquid crystal cells are known in the art and have been described variously, as for example, in U.S. Pat. Nos. 4,066,334 and 4,768,864 as well as the references cited therein, the contents thereof being incorporated herein by reference. In standard practice, liquid crystal cells are used to achieve specific electro-optic effects by placing a small amount of nematic liquid crystal material between two glass plates. For a range of angles of incidence on the liquid crystal interface, light is either partially transmitted or totally reflected, depending on the electric field orientation of the optic axis in the nematic material.

Figure 3:
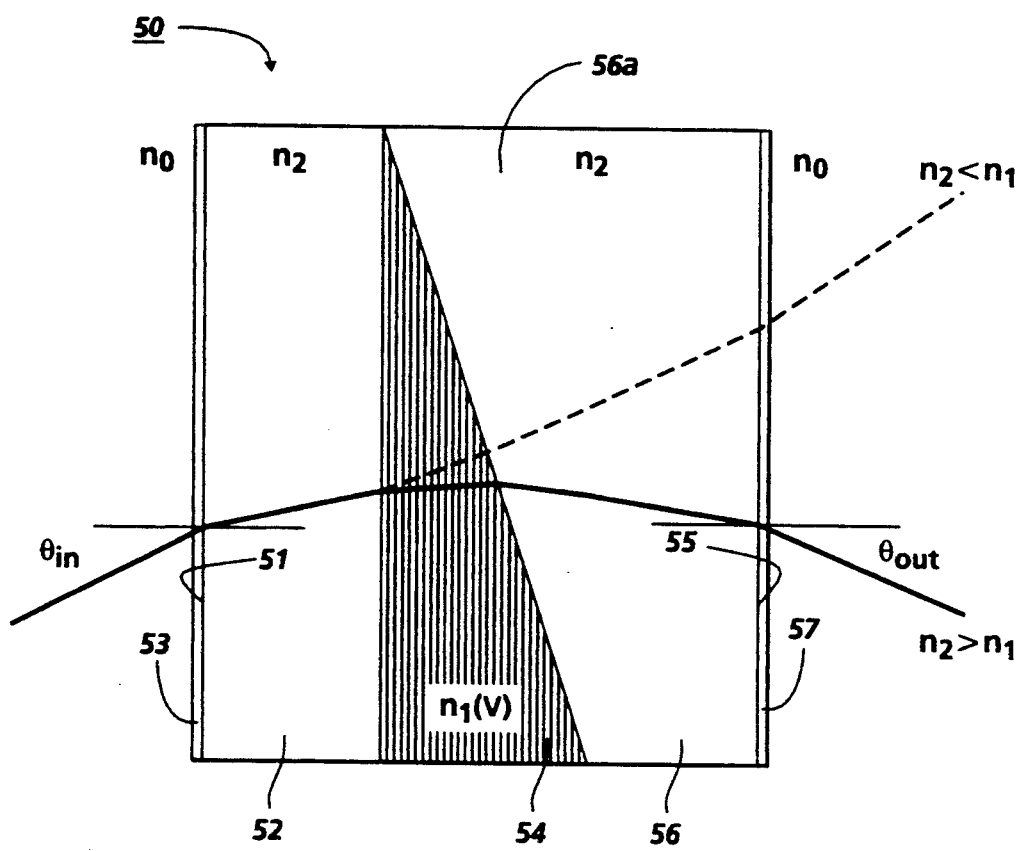
FIG. 3 shows a schematic side view of an optical element in accordance with the present invention.
Figure 4:
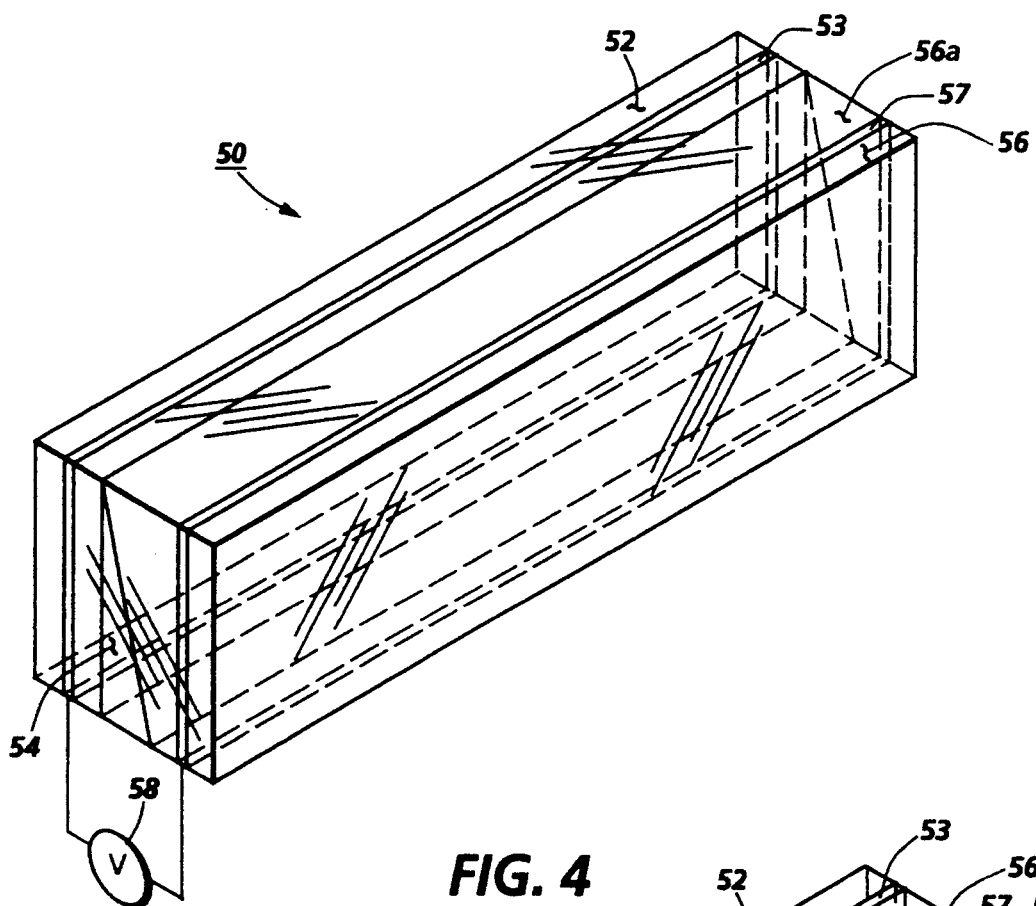
FIG. 4 shows a perspective schematic view of the optical element of FIG. 3.

FIGS. 3 and 4 show, in schematic form, a preferred embodiment of the liquid crystal member making up the optical element 50 in accordance with the present invention. The specific configuration of the optical element of the present invention provides a chamber 54 having a progressively decreasing volume from one marginal region to another profile positioned between two plates 52, 56 having substantially planar external surface 51, 55, respectively. The plates comprise glass or some other optically transmissive materials. One of the glass plates, in this case plate 56, is coated with a transparent dielectric material having a uniformly increasing thickness forming a dielectric wedge 56a and defining the decreasing volume of the chamber such that the chamber has a wedge-shaped profile between the two glass plates for receiving the liquid crystal material, thereby forming the optical element 50. The dielectric wedge could be made, for example, by dip coating a plate with a particular light transmissive material at a linearly varying rate. Alternatively, grinding or other methods can be used. The optical element is then assembled by positioning the two plates 52, 56 such that the exterior surfaces 51, 55 remain parallel to one another, forming a chamber 54 having a progressively decreasing volume from one marginal region to another marginal region opposed therefrom interposed between the plates 52, 56. The chamber 54 is then filled with the nematic liquid crystal material, as for example, a commercial nematic liquid crystal material produced by EM Industries of Hawthorne, N.Y., having a refractive index ranging from 1.33 to 1.79 depending on the voltage applied to the cell.

Conductive electrodes 53 and 57 are also provided for applying a biasing voltage across the chamber 54. In FIG. 3, transparent conductive electrodes 53 and 57 are placed directly on the exterior faces 51, 55 of the two glass substrates 52, 56, respectively. Alternatively, the transparent electrodes 53 and 57 may be embedded into the plates, as shown in FIG. 4. It is an important feature of the present invention that the electrodes are positioned parallel to one another in order to create uniform electric fields therebetween. That is, due to the biasing voltage applied to the electrodes 53, 57 by voltage source 58, electrodes 53 and 57 generate uniform electric fields across the chamber 54 to induce reorientation of the molecules in the chamber 54 and thereby control the refractive index thereof. While it may be possible to place the liquid crystal material between two flat glass plates that are angularly positioned with respect to one another to form a wedge or prism, the parallel configuration of the electrodes described by the present invention provides the capability to maintain a uniform electric field between the electrodes 53, 57 when a biasing voltage is applied thereto. This uniform electric field provides means for creating a uniformly variable refractive index within the chamber 54. A typical liquid crystal cell of the type described herein should have a maximum thickness of less than 300 micrometers. For the purposes of the present invention, a liquid crystal cell having a wedge of approximately 50 micrometers over a 1 mm aperture was utilized to form a wedge angle of 0.05 radians.

Figure 5:
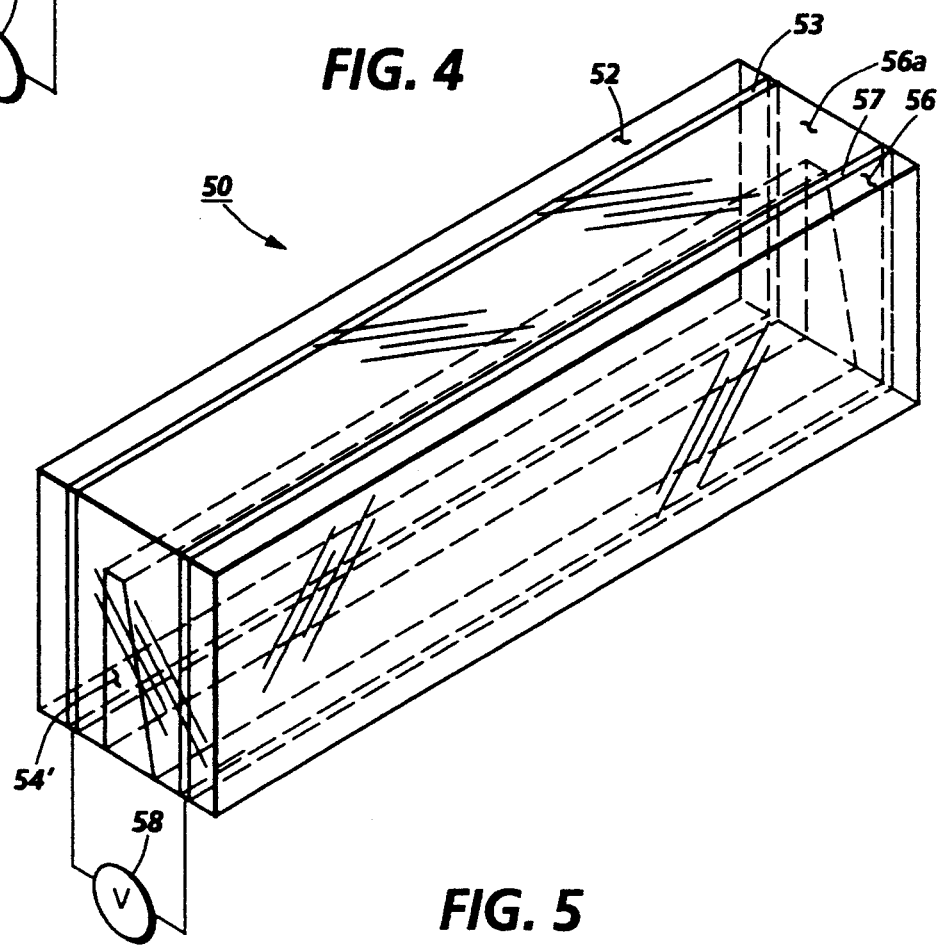
FIG. 5 shows a perspective schematic view of an alternative embodiment of an optical element in accordance with the present invention.

An alternative embodiment of the optical element 50 of the present invention is shown in FIG. 5. In this alternative embodiment, the chamber 54 is truncated to form the frustum of a prism or a truncated triangular shape, as shown. The configuration shown in this embodiment may provide specific advantages with respect to manufacturing and cost without degrading from the optical deflection capabilities of the optical element of the present invention.

The qualitative aspects of the electro-optic effect provided by the optical element in the present invention can be explained by a simple application of Snell's Law:

$$N_i \sin\theta = N_i' \sin\theta_i'$$

In the present analysis, Snell's Law must be applied four times at the air/glass interface along exterior face 51, at the glass/liquid crystal interface between plate 52 and chamber 54, at the liquid crystal/glass interface between chamber 54 and plate 56, and the glass/air interface along exterior face 55 in order to determine the aggregate angle of refraction for light rays passing through the optical element 50. For simplicity, it is assumed that the material making up the dielectric wedge 56a has a refractive index similar to the glass substrate. However, it will be recognized by those of skill in the art that the dielectric wedge 56a may be composed of a material having a unique refractive index independent of that of the substrate making up the plates of the optical element 50. It will be appreciated that calculations based on Snell's Law will yield an output angle as a function of the input angle and the refractive index of the flat plate material as well as the variable refraction in the liquid crystal cell. In a typical application, the angular range covered by varying the voltage applied to the liquid crystal cell is in the range of 1 to 1.5 degrees. This angular range can be increased substantially for larger angles of incidence. Likewise, smaller angular ranges can be provided by reducing the wedge dimensions and/or by reducing the refractive index change attainable with the liquid crystal material.

As previously discussed, the optical element of the present invention is proposed for use in the alignment of ROS scan lines in the slow scan direction for a tandem xerographic printing engine systems. Typically, a coarse alignment can be made within an electronic tandem engine to within one half of a pixel width via an electronic delay line or a buffer. The present invention provides for the critical adjustment of the optical system on the order of a pixel width of less. Various embodiments of an error detection and feedback control circuit 60, as shown in FIG. 1 are contemplated for determining the existence and extent of the alignment error of a scan line on the photoreceptive surface 2 and for controlling the biasing voltage applied to the optical element for controlling the refractive index of the liquid crystal material as required to correct the alignment error. Error detection and feedback control circuitry used for this purpose are known in the art. For example, an exemplary system is shown in U.S. patent application Ser. No. 07/740,543, of common assignee, wherein a start of scan sensor emits signals at a frequency equal to the system slow scan resolution while timing marks are sensed by a light source/detector combination to provide the basic timing signals for the synchronization of the control system. The beam is initially aligned and adjusted with some relationship to the occurrences of the photoreceptor timing marks. A phase detector detects the phase difference between the signal from the start of scan detector and the timing marks on the photoreceptor and generates a phase error voltage that is fed to a biasing source which applies an appropriate biasing voltage across the electrodes 53, 57 of the optical element 50 to make the necessary process direction correction.

It will be understood that the positioning of the optical element 50 of the present invention may be placed in various locations along the scan path of the ROS. However, it will be further understood by those of skill in the art, that it is preferable to place the optical element of the present invention in regions where the light beam has a limited divergence angle or where configuration complications do not exist. As such, FIG. 1 shows two preferred locations for the optical element 50. A first alternative location is to position the optical element 50 between the laser collimating lens 14 and the facet 16. This position is very desirable since the beam transmitted from the laser diode is relatively small and, therefore, a very compact liquid crystal cell could be used to implement the objectives of the present invention. By placing the electro-optic device of the present invention in the prescan optics of the ROS, the positional change achievable at the photoreceptor would be the product of the translation on the facet and the magnification of the facet image. For an exemplary toroidal system, the sagittal magnification will most likely be in the region between 1-10 such that the toroidal design ROS can be scanned more than 1-10 pixel widths. Another preferred alternative location for the optical element 50 of the present invention may include a position between the scan and magnification lenses 17 and the imaging surface 2. Locating the optical element 50 in the post-scan optics may be less advantageous due to the fact that a larger size element will be needed for shifting the entire scan line. However, other design considerations may make it desirable to position the optical element in the post-scan optics. For example, in practice a ROS is embodied in a modular device including a window from which the light beam is transmitted onto the imaging screen; replacement of this window by the optical element of the present invention may be desirable.

In recapitulation, there has been shown a device and apparatus for scan line process direction control in a multicolor electrostatographic machine by means of an electro-optic device placed in the optical system of a raster output scanning system. The present invention provides an optical element which facilitates control of the scan line positioning to provide exact location of the scan line on the photoreceptor. A control system used in combination with the optical element of the present invention may be adapted to monitor the positioning of the each scan line and to apply a voltage to the optical element for changing the refractive index thereof to shift the position of a scan line. A novel configuration of the optical element having a liquid crystal chamber providing the desirable characteristics to provide the desired results is disclosed.

While the invention has been described with reference to the structure disclosed, it will be appreciated that numerous changes and modifications are likely to occur to those skilled in the art. The present invention is intended to cover all changes and modifications which fall within the true spirit and scope of the invention.

I claim:

1. An optical element, comprising:
    a member including first and second optically transmissive plates forming a pair of parallel external surfaces and defining a chamber therebetween, wherein one of said optically transmissive plates has a linearly varying thickness such that said chamber is provided with a wedge-shaped cross-section having a progressively decreasing volume from one marginal region to another marginal region opposed therefrom; and
    a material having a variable index of refraction substantially filling the chamber of said member for selectively deflecting a light beam passing therethrough.

2. The optical element of claim 1, further including means for applying a biasing voltage across said member to generate uniform electric fields through said material to vary the index of refraction thereof as a function of the applied biasing voltage.

3. The optical element of claim 2, further including a pair of electrodes disposed substantially parallel to one another on opposite sides of the chamber, said electrodes being coupled to said biasing voltage applying means.

4. The optical element of claim 3, wherein each of said pair of electrodes is disposed on a respective one of said pair of external surfaces.

5. The optical element of claim 1, wherein the optically transmissive plate having a linearly varying thickness includes first and second segments of optically transmissive material in abutment with one another, said first segment having a first index of refraction, and said second segment having a second index of refraction different from the first index of refraction.

6. The optical element of claim 1, wherein said material having a variable index of refraction includes a nematic liquid crystal material.

7. The optical element of claim 1, wherein the index of refraction of the nematic material ranges between approximately 1.33 and 1.79 as a function of a biasing voltage applied thereto.

8. The optical element of claim 1, wherein said member has a maximum thickness of approximately 300 micrometers.

9. A raster output scanner, comprising:
means for generating a light beam modulated in accordance with a video input data signal;
means for scanning the light beam onto a movable imaging surface being transported in a process direction to provide successive scan lines on the movable imaging surface;
an optical element having a variable index of refraction as a function of voltage applied thereacross, including
a member including first and second optically transmissive plates forming a pair of parallel external surfaces and defining a chamber the therebetween, wherein one of said optically transmissive plates has a linearly varying thickness such that said chamber is provided with a wedge-shaped cross-section having a progressively decreasing volume from one marginal region to another marginal region opposed therefrom; and
a material having a variable index of refraction substantially filling the chamber of said member for selectively deflecting a light beam passing therethrough; and
a voltage source coupled to said optical element to generate a substantially uniform electric field therethrough so as to control the index of refraction of said optical element.

10. The raster output scanner of claim 9, wherein said optical element defines a chamber including of a nematic liquid crystal material substantially filling the chamber, said nematic liquid crystal material having a variable index of refraction as a function of a biasing voltage applied thereto.

11. The raster output scanner of claim 10, wherein said optical element further includes first and second electrode members respectively positioned substantially parallel to one another on opposite sides of the chamber, said electrodes being coupled to said voltage source for applying a biasing voltage across said nematic liquid crystal material to produce uniform electric fields therethrough.

12. The raster output scanner of claim 9, wherein the plate having a linearly varying thickness includes first and second segments of optically transmissive material in abutment with one another, said first segment of optically transmissive material having a first index of refraction and said second segment of optically transmissive refraction.

13. The raster output scanner of claim 10, wherein the variable index of refraction of the nematic liquid crystal material ranges between approximately 1.33 and 1.79 as a function of the biasing voltage applied thereto.

14. The raster output scanner of claim 9, wherein said optical element has a maximum thickness of approximately 300 micrometers.

15. The raster output scanner of claim 9, further including:
means for detecting scan line position on the imaging member to generate an error signal in response thereto; and
means, responsive to the error signal, for controlling the biasing voltage applied to the optical element for selectively varying the index of refraction thereof.

16. An electrostatographic printing machine in which a raster output scanner produces a modulated light beam wherein the modulated light beam is scanned across a movable photoconductive imaging surface being transported in a process direction for recording latent images thereon, comprising:
an optical element having a variable index of refraction as a function of voltage applied thereacross, including
a member including first and second optically transmissive plates forming a pair of parallel external surfaces and defining a chamber therebetween, wherein one of said optically transmissive plates has a linearly varying thickness such that said chamber is provided with a wedge-shaped cross-section having a progressively decreasing volume from one marginal region to another marginal region opposed therefrom; and
a material having a variable index of refraction substantially filling the chamber of said member for selectively deflecting a light beam passing therethrough; and
a voltage source coupled to said optical element to generate a substantially uniform electric field therethrough so as to control the index of refraction of said optical element.

17. The electrostatographic printing machine of claim 16, wherein said optical element defines a chamber including of a nematic liquid crystal material substantially filling the chamber, said nematic liquid crystal material having a variable index of refraction as a function of a biasing voltage applied thereto.

18. The electrostatographic printing machine of claim 17, wherein said optical element further includes first and second electrode members respectively positioned substantially parallel to one another on opposite sides of the chamber, said electrodes being coupled to said voltage source for applying a biasing voltage across said nematic liquid crystal material to produce uniform electric fields therethrough.

19. The electrostatographic printing machine of claim 16, wherein the plate having a linearly varying thickness includes first and second segments of optically transmissive material in abutment with one another, said first segment of optically transmissive material having a first index of refraction and said second segment of optically transmissive material having a second index of refraction different from the first index of refraction.

20. The electrostatographic printing machine of claim 17, wherein the variable index of refraction of the nematic liquid crystal material ranges between approximately 1.33 and 1.79 as a function of the biasing voltage applied thereto.

21. The electrostatographic printing machine of claim 16, wherein said optical element has a maximum thickness of approximately 300 micrometers.

22. The electrostatographic printing machine of claim 16, further including
means for detecting scan line position on the imaging member to generate an error signal in response thereto; and
means, responsive to the error signal, for controlling the biasing voltage applied to the optical element for selectively varying the index of refraction thereof.

* * * * *